US006533055B2

(12) United States Patent  (10) Patent No.: US 6,533,055 B2
Matsuura et al.  (45) Date of Patent: *Mar. 18, 2003

(54) ELECTRICAL OUTLET ARRANGEMENT FOR ATV

(75) Inventors: Tatsuya Matsuura, Iwata (JP); Yasuhiro Suzuki, Iwata (JP)

(73) Assignee: Yamaha Hatsudoki Kabushiki Kaisha (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/560,300

(22) Filed: Apr. 27, 2000

(65) Prior Publication Data
US 2001/0047896 A1 Dec. 6, 2001

(30) Foreign Application Priority Data
Apr. 27, 1999 (JP) .......................... 11-120560

(51) Int. Cl.$^7$ .......................... B62D 39/00; B60R 19/00
(52) U.S. Cl. .................. 180/89.1; 280/727; 296/198; 293/1
(58) Field of Search .................. 180/89.1; 280/727; 296/198; 293/106, 1

(56) References Cited

U.S. PATENT DOCUMENTS

| 4,113,045 A | * | 9/1978 | Downing, Jr. ............ 180/65.4 |
| 4,249,035 A | * | 2/1981 | Watley .................... 174/52.1 |
| 4,713,017 A | * | 12/1987 | Pesapane .................. 439/142 |
| 4,785,227 A | * | 11/1988 | Griffin ....................... 322/1 |
| 4,807,895 A | * | 2/1989 | Thomas et al. ............. 280/853 |
| 4,837,494 A | * | 6/1989 | Maier ......................... 322/1 |
| 5,364,142 A | * | 11/1994 | Coiner ...................... 293/117 |
| 5,563,451 A | * | 10/1996 | Furukawa ................. 307/10.1 |
| 6,340,177 B1 | * | 1/2002 | Granderson et al. ....... 280/833 |

FOREIGN PATENT DOCUMENTS

JP  61-50834  * 3/1986

OTHER PUBLICATIONS

U.S. patent application Ser. No. 09/553652, Matsuura, filed Apr. 21, 2000.
U.S. patent application Ser. No. 09/552982, Matsuura, filed Apr. 21, 2000.
Dirtwheels magazine; Apr. 2000, Yamaha Wolverine 350 vs. Honda Rancher 350FM, pp. 37–46.
Yamaha ATV 1998 brochure, Front cover, Grizzly 4wd full view and power outlet view; Big Bear 4x5 and Big Bear 350 full views and power outlet view.
PR Newswire Publication dated Sep. 8, 1999 regarding introduction of first Honda Rancher, (3 pages).
Image from website of Honda Rancher believed to have been introduced on or about Sep. 8, 1999.

* cited by examiner

Primary Examiner—Avraham Lerner
(74) Attorney, Agent, or Firm—Knobbe, Martens, Olson & Bear, LLP

(57) ABSTRACT

An arrangement for an electrical outlet for an all terrain vehicle is provided. The all terrain vehicle comprises a frame defining an engine compartment. The frame is supported by at least one front wheel and at least one rear wheel. A fender assembly is disposed above one or more of the wheels and has a recess formed therein. An electrical outlet is at least partially disposed in the recess. The recess includes a sloping lower surface to facilitate drainage. A hood is disposed above the recess and protects the electrical outlet.

43 Claims, 5 Drawing Sheets

ELECTRICAL OUTLET ARRANGEMENT FOR ATV

PRIORITY INFORMATION

This application is based on and claims priority from Japanese Patent Application No. 11-120560, filed Apr. 27, 1999, the entire contents of which is hereby expressly incorporated by reference.

BACKGROUND OF THE INVENTION

1. Field of the Invention

The present invention relates generally to component layouts for all terrain vehicles. More particularly, the present invention relates to arrangements for electrical outlets for all terrain vehicles.

2. Description of the Related Art

All terrain vehicles can include an electrical outlet that is used to power electrical appliances from a battery and/or generator associated with the vehicle. Because all terrain vehicles are often operated in adverse environmental conditions, it is not uncommon for water, snow, mud, or other foreign materials to get into the electrical outlet. The electrical outlet is eventually damaged thereby and must be repaired or replaced. In addition, because the electrical outlet sometimes is located within the region occupied by a leg of an operator, the inside of the leg or knee of the operator can inadvertently strike the outlet when the operator is riding on the vehicle in typical straddle fashion.

SUMMARY OF THE INVENTION

Accordingly, an arrangement for an electrical outlet for an all terrain vehicle is provided, wherein the electrical outlet is at least partially disposed within a recess formed in a fender assembly of the vehicle. The recessed location helps to protect the electrical outlet from water, mud, and other foreign materials that might otherwise damage the electrical outlet. The recessed location also serves to protect the electrical outlet from damage caused by impact to the electrical outlet, such as from trees or other objects. Furthermore, because the electrical outlet is located within the recess, it does not extend into the operating space of the vehicle between the front and rear fender assemblies. The leg or knee of the operator is therefore less likely to bump the electrical outlet.

One aspect of the present invention, therefore, involves an all terrain vehicle comprising a frame assembly. At least one front wheel and at least one rear wheel support the frame assembly. An engine compartment is defined within the frame assembly between the front wheel and the rear wheel. An engine is mounted in the engine compartment and a drive train drivingly couples the engine to one or more of the wheels. A fender assembly is disposed above one or more of the wheels and the fender assembly has a recess formed therein. An electrical outlet is at least partially disposed in the recess.

Another aspect of the present invention involves an all terrain vehicle comprising a frame assembly with a forward wheel that is rotatably attached to the frame assembly. A fender is disposed generally above and covers at least a portion of the wheel. A recess is formed in the recess and an electrical outlet is positioned within the recess.

BRIEF DESCRIPTION OF THE DRAWINGS

These and other features, aspects and advantages of the present invention will now be described with reference to the drawings of a preferred embodiments which embodiment is intended to illustrate and not to limit the invention, and in which drawings.

DETAILED DESCRIPTION OF THE PREFERRED EMBODIMENT

Figure 1:
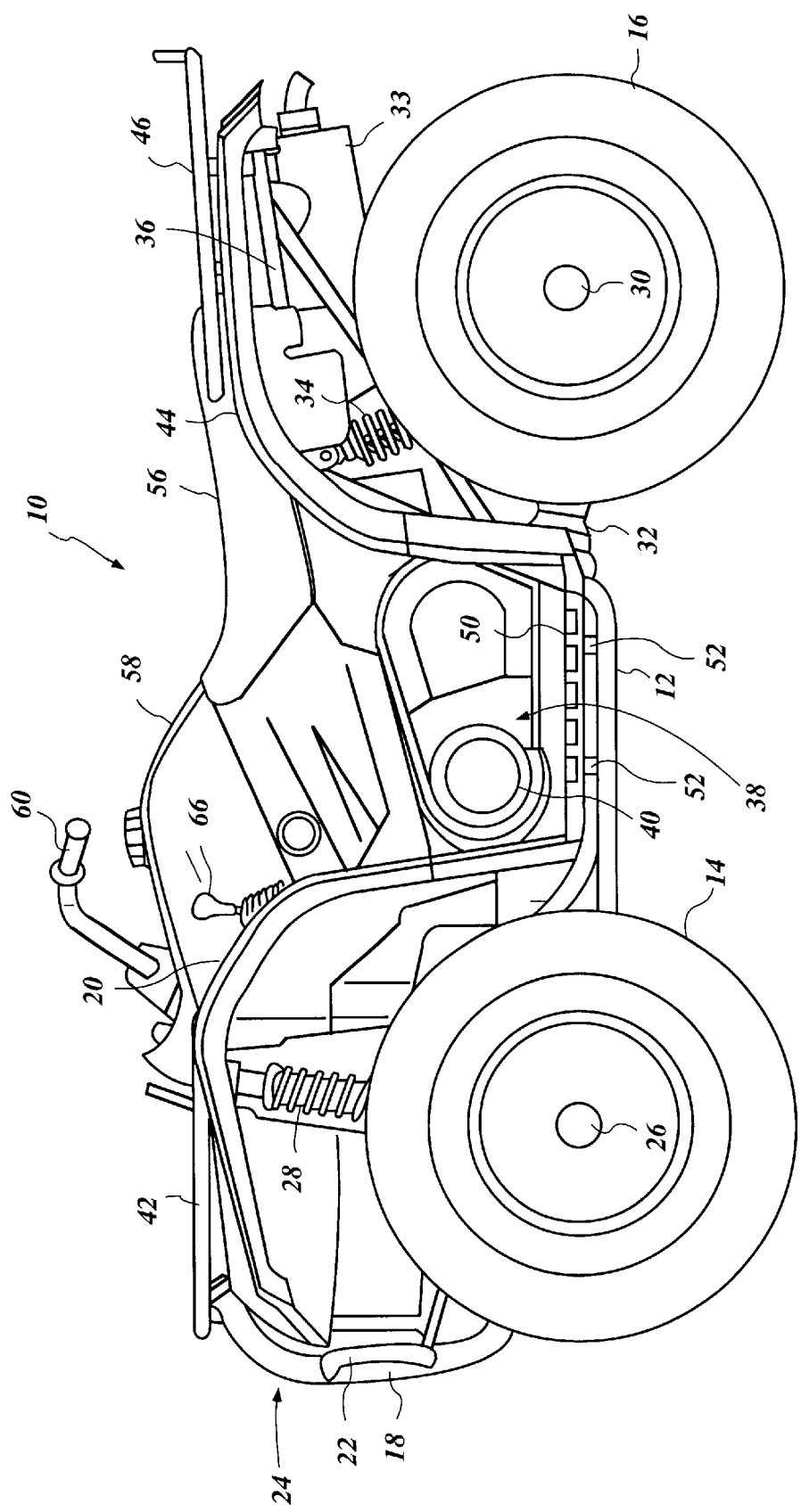
FIG. 1 is a left side elevational view of an all terrain vehicle having certain features and aspects in accordance with the present invention.

With reference now to FIG. 1, an all terrain vehicle is illustrated and generally indicated by the reference numeral 10. The illustrated vehicle 10 generally comprises a gear shift arrangement configured in accordance with certain features, aspects and advantages of the present invention, as will be described below. While the present invention will be described in the context of the illustrated vehicle 10, it should be understood that the present invention may also find utility in a number of other applications. For instance, the present invention can be used in a variety of other vehicles, such as snowmobiles, tractors, garden equipment and the like. Those of ordinary skill in the relevant arts will readily appreciate the broad array of applications in which the present invention can be used.

With continued reference to FIG. 1, the illustrated vehicle 10 generally comprises a frame assembly 12 that is dirigibly supported by a plurality of wheels. In the illustrated arrangement, the frame assembly 12 is carried by a pair of front wheels 14 and a pair of rear wheels 16. As will be recognized, the vehicle 10 could be carried by a single forward wheel and a pair of rear wheels, a pair of forward wheels and single rear wheel, or any number of front or rear wheels. Furthermore, as discussed above, the present invention can also be used with vehicles that utilize driving track arrangements and forward runners for instance.

The frame assembly 12 is generally of the welded up type, such as that known to those of ordinary skill in the art. While not illustrated, the presently preferred type of frame comprises a left side assembly and right side assembly. The left side assembly and the right side assembly form generally parallelogram side structures that are interconnected with crossing members. Because these assemblies are well known to those of ordinary skill in the art, further description of the frame assembly 12 is deemed unnecessary to understand the present invention.

Figure 3:
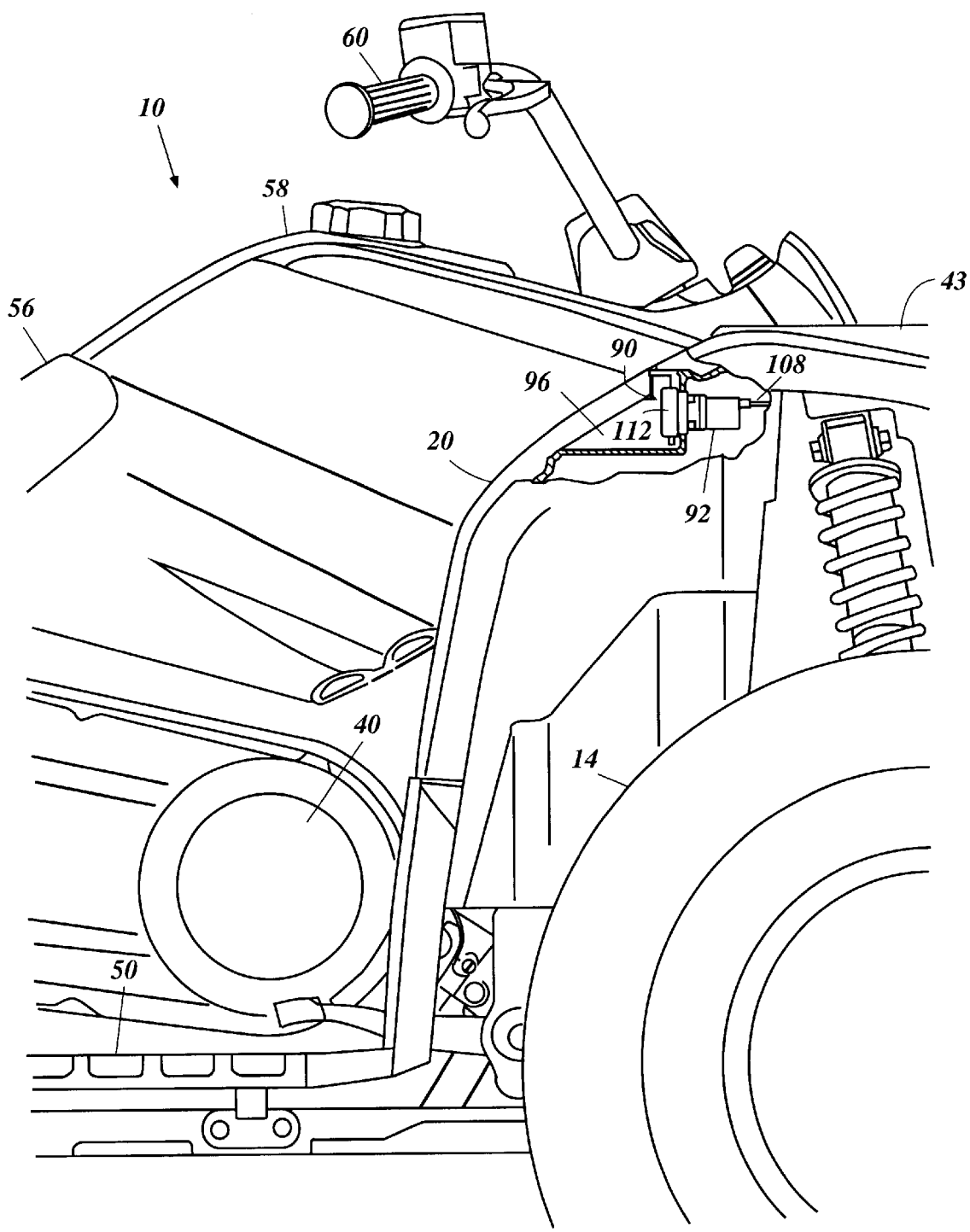
FIG. 3 is a partially sectioned right side elevational view of the all terrain vehicle of FIG. 1, with a portion of the front fender assembly removed to better illustrate a presently preferred location of an electrical outlet.

A forward portion of the illustrated frame assembly 12 comprises a front bumper 18. With reference now to FIGS. 1 and 3, the front bumper 18 preferably extends upwardly and forwardly of a lower portion of the illustrated frame assembly 12. In this manner, the front bumper 18 wraps over a forward portion of a front fender assembly 20, which will be described below. The front bumper 18 can be formed integrally with the frame assembly 12 or can be a separate add-on component, as will be recognized by those of ordinary skill in the art.

Figure 2:
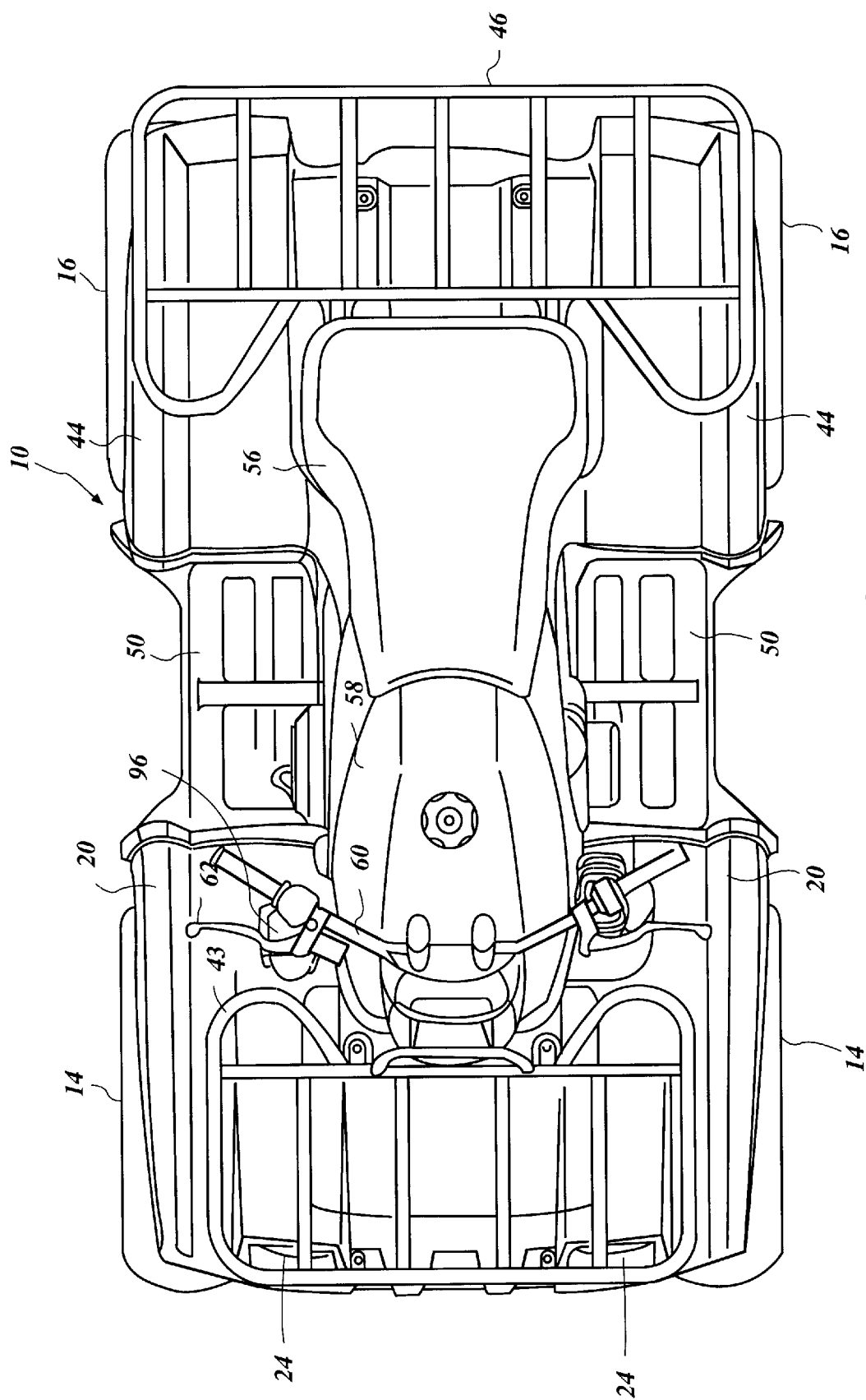
FIG. 2 is a top plan view of the all terrain vehicle of FIG. 1.

Additionally, the front bumper 18 preferably comprises a pair of headlight protectors 22 that extend laterally outward from the front bumper 18. The illustrated headlight protectors 22 wrap around and protect a pair of forwardly directed headlights 24, which are best shown in FIGS. 2 and 3.

The illustrated front wheels 14 are rotatably supported by a front suspension system. The illustrated front suspension system generally comprises a pair of A arms 25. The A arms 25 preferably extend laterally outward from the frame assembly 12 and support a carrier hub, which is not shown. Each front wheel 14 is supported by a front axle 26 that is journaled by the carrier hub (not shown). In addition, a shock absorber or strut 28 extends between a portion of the frame assembly 12 and the carrier hub to control vertical movement of the axle 26 during operation of the vehicle 10. Each shock absorber 28 is mounted in a suitable manner at an upper portion to the frame assembly 12 and at a lower portion to either the A arm 25 or the carrier hub. Preferably, the shock absorber 28 is positioned rearward of the axles 26 and is slightly inclined rearward. Such a positioning and disposition results in a more compact construction for the overall vehicle and better accommodates various components within an engine compartment, as will be described. Because the suspension arrangement generally is well known to those of ordinary skill in the art, further description of the arrangement is deemed unnecessary.

With continued reference to FIG. 1, the rear wheel 16 preferably also rotates about an axle 30. In the illustrated arrangement, both of the rear wheels 16 are mounted to a common axle 30; however, independently suspended rear wheels 16 also can be used. The illustrated axle 30 is rotatably supported by a rear swing arm 32, which extends from a portion of the frame assembly 12. Movement of the rear arm 32, and therefore the axle 30, is controlled using a shock absorber 34. The swing arm 32 preferably is pivotally attached to the frame assembly 12 and rotates about a generally horizontal axis. The shock absorber 34 can be connected to the swing arm 32 or to a gear box that is attached to a portion of the swing arm 32 proximate the axle 30. In addition, an upper portion of the shock absorber 34 preferably is connected to a portion of the frame assembly 12 such as a seat rail 36. In this manner, movement of the rear wheels 16 about the pivot point defined by the swing arm 32 can be controlled. In addition, in the illustrated arrangement, a muffler 33 is connected to the frame assembly 12 directly rearward of the shock absorber 34.

The illustrated frame assembly 12 forms a platform upon which a variety of other D components are mounted. For instance, the hollow center of the illustrated frame assembly 12 generally defines an engine compartment 38. The engine compartment 38 generally is defined between the left portion and the right portion of the frame assembly 12 and generally is disposed between the front axle 26 and the rear axle 30. This location provides a low center of gravity for the vehicle by mounting a centrally located engine 40 within the engine compartment 38. The engine 40 can be of any suitable construction and can be positioned either transversely or longitudinally within the engine compartment 38. In other words, a crankshaft (not shown) of the engine 40 can extend transverse to the direction of travel of the vehicle 10 or can extend along the same direction of travel of the vehicle.

In some applications, such as the illustrated arrangement, a side panel 39 can at least partially enclose the engine compartment 38. The side panel 39 preferably extends downward from a portion of a seat 56 and a fuel tank 58 toward an exterior surface of the engine 40 and an associated transmission 64.

As indicated above, a front fender assembly 20 preferably is disposed above the forward wheels 14. Tile front fender assembly 20 can be comprised of a single component or multiple components and preferably extends around the front portion of the vehicle 10. The front fender assembly 20 desirably is made from a moldable resin material or a lightweight sheet metal and preferably is mounted to the frame assembly in any suitable manner. The illustrated arrangement uses threaded fasteners to removably attach the front fender assembly 20 to the frame assembly 12.

In the illustrated arrangement, a carrier rack 42 is mounted above a portion of the front fender assembly 20. With reference to FIG. 2, the carrier rack 42 preferably is connected to the front fender assembly 20 using mechanical fasteners 43, such as threaded fasteners, for instance. More preferably, the carrier rack 42 is connected to the front fender assembly 20 using threaded fasteners 43, or other mechanical fasteners, that can be removed from the top of the vehicle. The use of top mounted fasteners advantageously allows easy removal of the carrier rack 42 for maintenance. For instance, when operating the vehicle on a trail, should the carrier rack need to be removed to access a component that is positioned under the carrier rack 42, it is preferred that an operator not have to crawl underneath the vehicle to remove the carrier rack. Of course, the carrier rack 42 can be connected to the front bumper 18 and can be pivotally connected to the front bumper 18 is other applications. By pivotally mounting the carrier rack 42, the carrier rack 42 can be pivoted out of the way for maintenance without completely removing the rack 42 from the vehicle 10.

With reference again to FIG. 2, a rear fender assembly 44 is disposed above the rear wheels 16 on the illustrated vehicle 10. Similar to the front fender assembly 20, the rear fender assembly 44 desirably extends above both rear wheels 16 and preferably is formed as one or more than one components. In the illustrated arrangement, the rear fender assembly 44 is formed of a single component and carries a rear carrying rack 46. The rear fender assembly 44 can be manufactured from a variety of materials including molded resin composites and lightweight sheet metals. Desirably, the rear fender assembly 44 and the front fender assembly 20 protect the operator of the vehicle from debris kicked up by the tires during movement of the vehicle 10.

With reference now to FIG. 2, a pair of footsteps 50 extend laterally from a central portion of the illustrated vehicle 10. The footsteps 50 can be mounted to the frame assembly 12 in any suitable manner. Typically, the footsteps 50 are mounted using brackets 52, which extend outward from the frame assembly 12. Preferably, the footsteps 50 extend between a portion of the rear fender assembly 44 and a portion of the forward assembly 20 to create an enclosed and protected rider leg area. In addition, the footsteps 50 preferably include traction increasing surfaces, such as raised ridges 54 to increase foot traction for the operator of the vehicle 10. In some arrangements, the footsteps 50 (also called foot boards) comprise plate-like members. In other arrangements, the footsteps 50 are nerf bars. In yet other applications, the footsteps are tubular components upon which a rider can be supported.

A seat 56 preferably is disposed above a portion of the rear fender assembly 44. The seat 56 generally is configured to allow an operator to sit in straddle fashion with one leg on each footstep 50. Of course, the seat 56 can be configured to accommodate more than one rider in a tandem straddle fashion. The illustrated seat 56 is mounted to the seat rails 36 in any suitable manner, but preferably is mounted to the seat rails 36 in a locking and pivoting arrangement. More particularly, the seat 56 preferably includes a portion which is pivotably attached to the seat rails 36 such that the seat 56 can be unlatched and raised to access the engine compartment 38. In some arrangements, the seat can freely pivot and is not latched; however, latching better secures the seat 56 to the frame assembly.

With continued reference to FIGS. 1 and 2, a fuel tank 58 preferably is disposed forward of the illustrated seat 56. The fuel tank 58 is mounted in any suitable manner and can be made from any suitable material. Preferably, the fuel tank 58 is made from molded resin materials; however, the fuel tank 58 also can be formed from a lightweight metal material. The fuel tank 58 preferably is mounted rearward of a steering handle assembly 60.

The steering handle assembly 60 is coupled to the front wheels 14 through a suitable steering arrangement, which is not shown. The steering handle arrangement 60 also generally comprises a throttle actuator of some sort. In one arrangement, the throttle actuator is a twist grip. In other arrangements, the throttle actuator may be a thumb paddle or handpull lever. Moreover, a brake control lever 62 can be mounted to the handlebar assembly 60 for operation of the brakes.

The vehicle 10 preferably also includes a gear shifting arrangement. The gear shifting arrangement preferably is controlled by means of a gear shift lever 66; however, it is anticipated that a push button arrangement also can be used. The gear shift lever 66 can be positioned anywhere proximate the operator of the vehicle 10 such that the gear shift lever 66 can be easily actuated by the operator. For instance, the lever 66 can be disposed on a portion of the front fender assembly 20 or on a portion of the rear fender assembly 44. In one arrangement, the gear shift actuator 66 is mounted within a recess formed within the forward fender assembly 20. In some arrangements, the gear shift lever 66 operates a shifting mechanism for use when the vehicle is on the fly and in other arrangements the gear shift operator actuator 66 is used to control the gear shifting while the vehicle is at a standstill.

The engine 40 provides power to one or more wheels of the vehicle 10 through a suitable drive train. In the illustrated embodiment, the drive train includes a v-belt type variable speed transmission coupled to a gear box. Desirably, the gear box is of the type that is shiftable between a number of different transmission states, such as high, low, neutral, reverse, and park, as is well known in the art.

With reference now to FIG. 3, the vehicle 10 preferably also includes an electrical outlet 90 that is configured and arranged in accordance with certain features, aspects and advantages of the present invention. The electrical outlet 90 can be used to power electrical appliances with energy drawn from a battery and/or generator (not shown) associated with the engine 40. Preferably, the electrical outlet 90 supplies 12 volt DC power; however, the type of power supplied by the electrical outlet 90 will depend upon the particular electrical system of the vehicle 10 to which it is connected.

The electrical outlet 90 preferably comprises an electrical socket 92 of the type commonly found in automobiles and used for cigarette lighters and other appliances. However, it is to be understood that the electrical outlet 90 can alternatively comprise any other appropriate type of electrical socket configuration.

Figure 4:
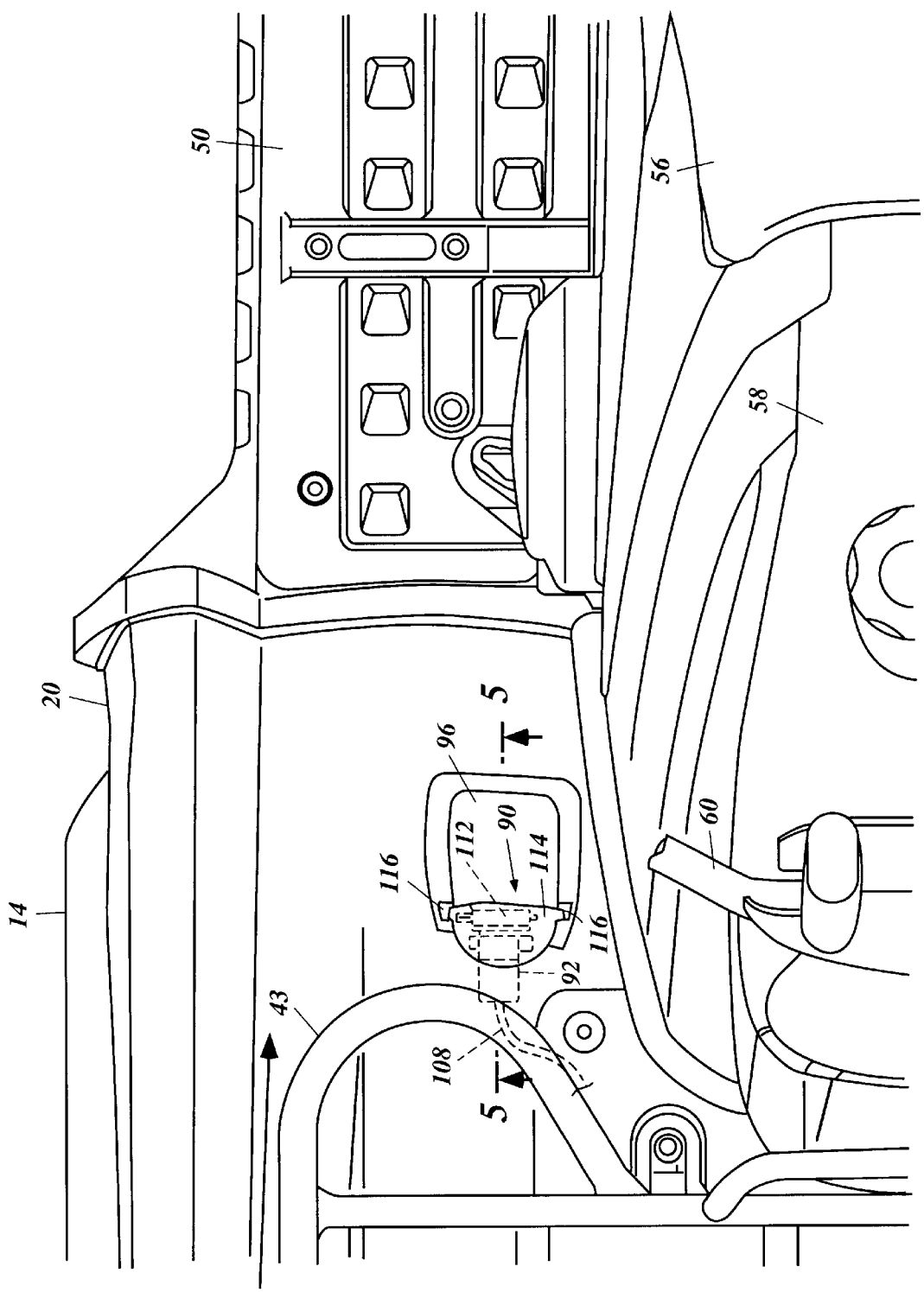
FIG. 4 is a top plan view of the all terrain vehicle of FIG. 1, with the electrical outlet illustrated in phantom.

With reference now to FIGS. 3 and 4, a recess 96 is formed in the front fender assembly 20 of the illustrated vehicle 10. A portion of the front fender assembly 20 has been cut away in FIG. 3 to better show the recess 96. The recess 96 preferably is formed on a rear side of the front fender assembly 20 adjacent the fuel tank 58. While this location is particularly preferred for reasons to be addressed below, it is to be understood that the recess 96 alternatively can be formed at other suitable locations, such as in the top of the front fender assembly 20 or in the rear fender assembly 44.

The recess 96 preferably is molded or pressed into the front fender assembly 20 during fabrication of the fender assembly 20. However, the recess 96 may alternatively comprise a separate cup-like component that fits into an opening formed in the front fender assembly 20. The recess 96 can have any of a number of suitable shapes, depending at least in part on the shape of the fender assembly in which it is formed. In the illustrated embodiment, the recess 96 is generally rectangular and is defined by a substantially horizontal bottom surface 102 and a substantially vertical front wall 104. However, as indicated above, the recess 96 can have a number of other suitable shapes, such as curvilinear or irregular shapes.

The recess 96 preferably is configured to prevent water, mud, and other foreign materials from accumulating in the recess 96. In one preferred arrangement, the bottom surface 102 of the recess 96 is sloped downwardly away from the front wall 104 to allow such foreign materials to drain out of the recess 96. In an alternative arrangement, one or more sloped drainage channels (not shown) can be formed along the bottom surface 102 of the recess 96. In another alternative arrangement, drain holes (not shown) can extend through the bottom surface 102 of the recess 96. The latter alternative is less preferred, however, because of the possibility that water and mud kicked up by the wheel 14 might enter the recess 96 through the drain holes from beneath the fender assembly 14. Of course, a baffle plate can be disposed below the holes to reduce the likelihood of this occurring.

Figure 5:
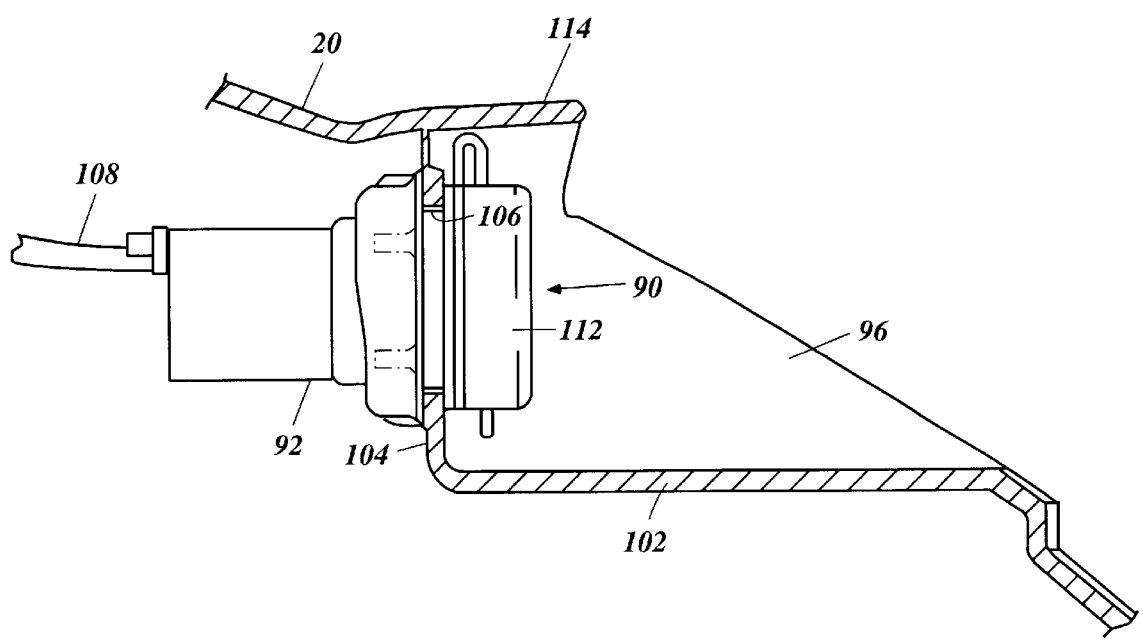
FIG. 5 is a cross-sectional view of the all terrain vehicle of FIG. 1, taken along the line 5—5 in FIG. 4.

With reference now to FIG. 5, an opening 106 preferably is provided in the recess 96. In the illustrated embodiment, the opening 106 is formed in the front wall 104 of the recess 96. However, while this is a preferred location, it is to be understood that the opening 106 can alternatively be formed in the bottom surface 102 of the recess 96, although this would be less desirable. In addition, depending on the particular shape of the recess 96, other locations may also be appropriate, such as in a side wall, for instance.

An end of the socket 92 extends from behind the fender assembly 20 through the opening 106 and into the recess 96. The socket 92 is preferably secured in place by clips or other suitable fasteners. A lead wire 108 electrically connects the socket 92 to the electrical system of vehicle 10. A removable protective cap 112 desirably is provided over the end of the socket 92 to help keep water mud, and other foreign materials from damaging the electrical outlet 90. Preferably, the recess 90 is sufficiently large to accommodate the cap 112 in arrangements in which the cap 112 is hingedly connected to the socket 92 or otherwise tethered thereto.

In a particularly preferred embodiment, a hood 114 is formed over the recess 96 to provide further protection for the electrical outlet 90 from rain, snow, mud, and the like. Preferably, the hood 114 is long enough to extend rearward beyond the protective cap 112 provided over the end of the socket 92. The hood 114 desirably extends upward in a rearward direction to reduce runoff rolling into the recess. In some arrangements, the hood 114 includes a downwardly extending partial wall that encloses at least a portion of the recess to reduce wind blown rain and the like from entering into the recess. The above-described constructions generally provide protection for the outlet 90 while still allowing convenient access to the outlet 90. In one preferred arrangement. the hood 114 is formed integrally with the front fender assembly 20. In an alternative arrangement, the hood 114 comprises a separate component that preferably removably clips into a pair of openings 116 provided in the fender assembly 20, as illustrated in FIG. 4.

The recess 96 helps to protect the electrical outlet 90 from water, mud, and other foreign materials that might otherwise damage the electrical outlet 90. The recess 96 also serves to protect the electrical outlet 90 from damage caused by impact to the electrical outlet 90, such as from trees or other objects. In the illustrated arrangement, the recess 96 is rearward-facing to provide additional protection.

The location of the illustrated electrical outlet 90 nevertheless allows the operator convenient access thereto, even from the vehicle 10 seat 56. Furthermore, in the illustrated embodiment, the electrical outlet 90 is located proximate the front carrier rack 42, upon which the appliances which are powered through the electrical outlet 90 can conveniently be placed.

Although the present invention has been described in terms of certain preferred embodiments, other embodiments apparent to those of ordinary skill in the art also are within the scope of this invention. Thus, various changes, modifications, and alterations may be made in the above-described embodiments without departing from the spirit and scope of the invention. For example, the electrical socket can alternatively be located in a recess formed in the rear fender assembly. In addition, a pivoting shield or door that selectively encloses the outlet in a chamber that is at least partially defined by the recess can be disposed over the opening into the recess. Such an arrangement, while adding complication, would afford even more protection to the outlet. Not all the features, aspects, and advantages are necessarily required to practice the present invention. Therefore, some of the features, aspects, and advantages may be separately practiced from other features, aspects, and advantages while still practicing a part or all of the above-described invention. Accordingly, the scope of the present invention is intended to be defined only by the claims that follow.

What is claimed is:

1. An all terrain vehicle comprising a frame assembly, at least one front wheel and at least one rear wheel supporting said frame assembly, an engine compartment being defined within said frame assembly between said front wheel and said rear wheel, an engine being mounted in said engine compartment, a drive train drivingly coupling said engine to one or more of said wheels, a fender assembly disposed above one or more of said wheels, said fender assembly having a recess formed therein, and an electrical outlet at least partially disposed in said recess.

2. The vehicle of claim 1, wherein said fender assembly is disposed above said front wheel.

3. The vehicle of claim 2, wherein said recess is formed in a rear portion of said fender assembly.

4. The vehicle of claim 2, wherein said recess opens in a rear-facing direction.

5. The vehicle of claim 3, wherein said recess is defined by a bottom surface and a substantially vertical front wall and said electrical outlet extends through said front wall.

6. The vehicle of claim 5, wherein at least a portion of said bottom surface is sloped to facilitate drainage of said recess.

7. The vehicle of claim 6, wherein said bottom surface slopes downward in a rearward direction.

8. The vehicle of claim 1, wherein said recess is formed integrally with said fender assembly.

9. The vehicle of claim 1 further comprising a protective hood being disposed over at least a portion of said recess.

10. The vehicle of claim 9, wherein said hood comprises a rear edge and said electrical outlet is completely disposed forward of said rear edge.

11. The all terrain vehicle of claim 9, wherein said hood is formed integrally with said fender.

12. An all terrain vehicle comprising a frame assembly, a forward wheel being rotatably attached to said frame assembly, a fender being disposed generally above and covering at least a portion of said wheel, a seat being positioned rearward of said fender, said seat being positioned over at least a portion of an engine, a recess being formed in said fender and an electrical outlet being positioned within said recess.

13. The vehicle of claim 12, wherein said fender comprises a generally horizontal upper portion and a downwardly sloping rear portion, said recess being formed on said rear portion.

14. The vehicle of claim 13 further comprising a protective upper fender lip, said fender lip extending outward over a portion of said recess and substantially covering said electrical outlet.

15. The vehicle of claim 13, wherein said recess is defined by at least a bottom wall and a side wall, said bottom wall sloping downward away from said side wall and said electrical outlet extending through at least one of said side wall and said bottom wall.

16. The vehicle of claim 13, wherein a protective cap is selectively positioned over an end of said electrical outlet.

17. The vehicle of claim 16, wherein said protective cap is hingedly connected to said electrical outlet.

18. The vehicle of claim 12 further comprising a carrying rack being at least partially disposed over at least a portion of said fender and said electrical outlet being positioned rearward of said carrying rack.

19. An all terrain vehicle comprising a frame assembly, at least one front wheeel supporting said frame assembly, a steering handle assembly operably connected to said at least one front wheel, a seat being connected to said frame assembly and being disposed rearwardly of said steering handle assembly, a front fender assembly being disposed over said at least one front wheel, a carrier rack being mounted above a portion of said front fender assembly, a recess being formed in said front fender assembly and an electrical outlet being positioned at least partially within said recess.

20. The vehicle of claim 19, wherein said recess and said electrical outlet are disposed proximate said carrier rack.

21. The vehicle of claim 20, wherein said recess and said electrical outlet are disposed rearward of at least a portion of said carrier rack.

22. The vehicle of claim 21, wherein said recess and said electrical outlet are disposed rearward of said carrier rack in its entirety.

23. The vehicle of claim 19, wherein said recess and said electrical outlet are disposed on a rear side of said front fender assembly.

24. The vehicle of claim 19, wherein said recess and said electrical outlet are disposed adjacent said fuel tank.

25. The vehicle of claim 24, wherein said recess and said electrical outlet also are disposed on a rear side of said front fender assembly.

26. The vehicle of claim 19, wherein said recess comprises a generally horizontal bottom surface.

27. The vehicle of claim 26, wherein said recess also comprises a generally vertical wall.

28. The vehicle of claim 27, wherein said generally horizontal bottom surface slopes slightly downward away from said generally vertical wall.

29. The vehicle of claim 28, wherein said generally vertical wall comprises an opening through which said electrical outlet extends.

30. The vehicle of claim 26, wherein said generally horizontal bottom surface comprises means for draining fluid from said recess.

31. The vehicle of claim 30, wherein said means for draining fluid from said recess comprises means for inhibiting flow from an underside of said front fender assembly into said recess.

32. The vehicle of claim 19, wherein said electrical outlet comprises a cap.

33. The vehicle of claim 32, wherein said recess is sized and configured to accommodate said cap.

34. The vehicle of claim 32, wherein said cap is hingedly connected to said electrical outlet.

35. The vehicle of claim 19, wherein said recess is at least partially covered by a hood.

36. The vehicle of claim 35, wherein said hood is a separate piece that is connected to said front fender assembly.

37. The vehicle of claim 35, wherein said hood extends outward over said electrical outlet.

38. The vehicle of claim 37, wherein said electrical outlet comprises a removable cap.

39. The vehicle of claim 38, wherein said hood extends outward a distance sufficient to cover said removable cap.

40. The vehicle of claim 39, wherein said hood and said recess are sized and configured to allow manual removal of said removable cap from said electrical outlet.

41. The vehicle of claim 19, wherein said at least one front wheel spins about a generally horizontal axis and said recess is disposed rearwardly of a generally transverse vertical plane that extends through said generally horizontal axis when said front wheel is oriented for substantially straight forward movement of the vehicle.

42. An all terrain vehicle comprising a frame assembly, a forward wheel being rotatably attached to said frame assembly, a fender being disposed generally above and covering at least a portion of said wheel, said fender comprising a generally horizontal upper portion and a downwardly sloping rear portion, a recess being formed on said rear portion of said fender and an electrical outlet being positioned within said recess, said recess is defined by at least a bottom wall and a side wall, said bottom wall sloping downward away from said side wall and said electrical outlet extending through at least one of said wall and said bottom wall.

43. An all terrain vehicle comprising a frame assembly, a forward wheel being rotatably attached to said frame assembly, a fender being disposed generally above and covering at least a portion of said wheel, a carrying rack being at least partially disposed over at least a portion of said fender, a recess being formed in said fender, an electrical outlet being positioned within said recess and said electrical outlet being positioned rearward of said carrying rack.

* * * * *